US008788221B2

(12) United States Patent
Hooper (10) Patent No.: US 8,788,221 B2
(45) Date of Patent: Jul. 22, 2014

(54) CABLE PULL CALCULATOR (75) Inventor: Allen Hooper, Acworth, GA (US)

(73) Assignee: Southwire Company, Carrollton, GA (US)

( * ) Notice: Subject to any disclaimer, the term of this patent is extended or adjusted under 35 U.S.C. 154(b) by 622 days.

(21) Appl. No.: 12/759,752

(22) Filed: Apr. 14, 2010

(65) Prior Publication Data
US 2011/0257905 A1 Oct. 20, 2011

(51) Int. Cl.
G01L 1/00 (2006.01)
G01L 5/00 (2006.01)

(52) U.S. Cl.
USPC ............................................. 702/43; 702/138

(58) Field of Classification Search
USPC .................................... 702/43, 138
See application file for complete search history.

(56) References Cited

PUBLICATIONS

Newton, Gerald, "Cable Tray Pulling Tension Calculator," Jan. 17, 2000, http://www.electrician2.com/calculators/traywireplull.htm, pp. 1-11.*

Newton, Gerald C, "NEC Table 310.15(B)(16) Ungrounded Conductor Size, OCPD, Voltage Drop, and Equipment Grounding Conductor Size Calculator," Nov. 2006, http://www.electrician2.com/calculators/wireocpd_ver_1.html, pp. 1-9.*
Southwire Power Cable Manual, 3$^{rd}$ Edition, Chapter 7, "Cable Installation," copyright 2005, Author: Dave Mercier, pp. 7-1-7-35.

* cited by examiner

Primary Examiner — Janet Suglo
(74) Attorney, Agent, or Firm — Merchant & Gould (57) ABSTRACT A cable pull calculator may be provided. First, wire number data, a wire type, and size data may be received. Next, a minimum conduit size for the conduit maybe calculated based upon the received wire number data indicating the number of wires to be placed in the conduit and the received size data corresponding to each of the wires to be placed in the conduit. Then, the calculated minimum conduit size may be displayed. Next, a first desired conduit size, a conduit type, and pull information indicating a course of the conduit may be received. Then, for each of the plurality of segments, a tension value and a sidewall pressure value may be calculated based at least on the conduit type, the first desired conduit size, the received wire type, and the received size data. The calculated tension value and the calculated sidewall pressure value may then be displayed.

40 Claims, 8 Drawing Sheets

| Wire pull / Segment | Straight Section | | | Bend Section | | | | COF 0 Recommended SIMpull CU THHN No Lube Required Colored wires | |
|---|---|---|---|---|---|---|---|---|---|
| | Angle (Slope) | Wire is being pulled | Segment Length ft | Bend Type | Up, Down, N/A | Degree of elbow | Radius (in.) | tension (lbs.) | sidewall pressure (lbs.) |
| 1 | ▶ 525 | ▶ 530 | 535 | ▶ 540 | ▶ 545 | ▶ 550 | ▶ 555 | 0 | 0 |
| 2 | ▶ | ▶ | | ▶ | ▶ | ▶ | ▶ | 0 | 0 |
| 3 | ▶ | ▶ | | ▶ | ▶ | ▶ | ▶ | 0 | 0 |
| 4 | ▶ | ▶ | | ▶ | ▶ | ▶ | ▶ | 0 | 0 |
| 5 | ▶ | ▶ | | ▶ | ▶ | ▶ | ▶ | 0 | 0 |
| 6 | ▶ | ▶ | | ▶ | ▶ | ▶ | ▶ | 0 | 0 |
| 7 | ▶ | ▶ | | ▶ | ▶ | ▶ | ▶ | 0 | 0 |
| 8 | ▶ | ▶ | | ▶ | ▶ | ▶ | ▶ | 0 | 0 |
| 9 | ▶ | ▶ | | ▶ | ▶ | ▶ | ▶ | 0 | 0 |
| 10 | ▶ | ▶ | | ▶ | ▶ | ▶ | ▶ | 0 | 0 |
| 11 | ▶ | ▶ | | ▶ | ▶ | ▶ | ▶ | 0 | 0 |
| 12 | ▶ | ▶ | | ▶ | ▶ | ▶ | ▶ | 0 | 0 |
| 13 | ▶ | ▶ | | ▶ | ▶ | ▶ | ▶ | 0 | 0 |
| 14 | ▶ | ▶ | | ▶ | ▶ | ▶ | ▶ | 0 | 0 |
| 15 | ▶ | ▶ | | ▶ | ▶ | ▶ | ▶ | 0 | 0 |
| 16 | ▶ | ▶ | | ▶ | ▶ | ▶ | ▶ | 0 | 0 |
| 17 | ▶ | ▶ | | ▶ | ▶ | ▶ | ▶ | 0 | 0 |
| 18 | ▶ | ▶ | | ▶ | ▶ | ▶ | ▶ | 0 | 0 |
| | | Total Length | 0 | | | | | | |

| Wire pull / Segment | Straight Section Angle (slope / degrees) | Wire is being pulled | Segment Length Ft | Bend Section Bend Type | Bend Section Up/Down | Bend Section Angle (elbow/degrees) | Bend Section Radius (in.) | tension (lbs.) | Sidewall pres. (lbs.) |
|---|---|---|---|---|---|---|---|---|---|
| 1 | 90 | UP | 6 | VCDN | UP | 90 | STD | 69 | 44 |
| 2 |  | HZTL | 10 | HZTL | N/A | 60 | STD | 94 | 61 |
| 3 |  | HZTL | 1 | HZTL | N/A | 60 | STD | 117 | 76 |
| 4 |  | HZTL | 250 | HZTL | N/A | 90 | STD | 441 | 286 |
| 5 |  | HZTL | 90 | VCUP | UP | 90 | STD | 707 | 455 |
| 6 | 90 | UP | 15 | VCDN | UP | 90 | STD | 1,041 | 675 |
| 7 |  | HZTL | 106 | HZTL | N/A | 90 | 18 | 1,536 | 785 |
| 8 |  | HZTL | 35 | VCDN | Down | 90 | 24 | 2,130 | 797 |
| 9 | 90 | Down | 20 |  |  |  |  | 2,040 | 797 |

505 — Wire pull / Segment
510 — Straight Section
515 — Bend Section
520 — COF 0.14, Recommended SIMpull CU THHN, No Lube Required, Colored wires
500 — table

FIG. 7

CABLE PULL CALCULATOR

COPYRIGHTS

All rights, including copyrights, in the material included herein are vested in and the property of the Applicant. The Applicant retains and reserves all rights in the material included herein, and grants permission to reproduce the material only in connection with reproduction of the granted patent and for no other purpose.

BACKGROUND

The term "conduit" is commonly used by electricians to describe any system that contains electrical conductors. An electrical conduit is an electrical piping system used for protection and routing of electrical wiring. Electrical conduit may be made of metal, plastic, fiber, or fired clay. Flexible conduit is available for special purposes. Conduit is generally installed by electricians at an electrical equipment installation site. Its use, form, and installation details are often specified by wiring regulations or other national or local code.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

A cable pull calculator may be provided. First, wire number data, a wire type, and size data may be received. Next, a minimum conduit size for the conduit maybe calculated based upon the received wire number data indicating the number of wires to be placed in the conduit and the received size data corresponding to each of the wires to be placed in the conduit. Then, the calculated minimum conduit size may be displayed. Next, a first desired conduit size, a conduit type, and pull information indicating a course of the conduit may be received. Then, for each of the plurality of segments, a tension value and a sidewall pressure value may be calculated based at least on the conduit type, the first desired conduit size, the received wire type, and the received size data. The calculated tension value and the calculated sidewall pressure value may then be displayed.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

Consistent with embodiments of the invention, a cable pull calculator may be provided. For example, a designer may want to pull a cable or cables through a conduit system having a starting point "A" and an ending point "B". The conduit system may run a certain course between point "A" and point "B" having a number of segments. Each of the segments may have a straight section that may be horizontal, vertical, or any angle between. Also, each of the segments may have a bend section that may sweep up, down, left, right, or in any direction at a certain angle through a certain sweep distance. Depending upon the shape of the conduit course, the size and conduit type, the size of the cable, and the type of outer jacket the cable has, the cable may be pulled through the conduit from point "A" to point "B" within safe limits as determined, for example, by the National Electric Code (NEC). Consistent with embodiments of the invention, a cable pull calculator may be provided that my show a designer if the safe limits have been exceeded.

Embodiments consistent with the invention may comprise a system for providing cable pull calculations. The system may comprise a memory storage for maintaining a database and a processing unit coupled to the memory storage. The processing unit may be operative to carry out one or more of method 300 stages' as described below with respect to FIG. 3.

Figure 1:
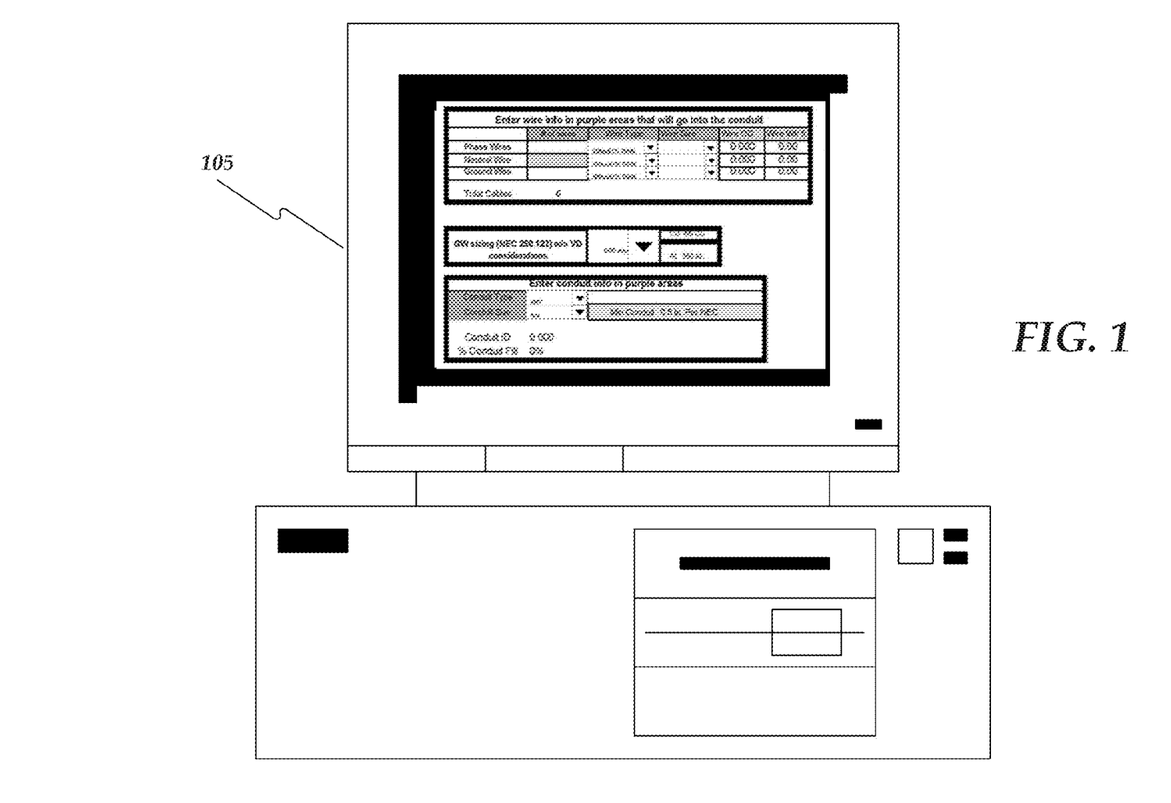
FIG. 1 is a block diagram of a cable pull calculator processor.

Consistent with embodiments of the present invention, the aforementioned memory, processing unit, and other components may be implemented in a computer processor, such as a cable pull calculator processor 105 of FIG. 1. Any suitable combination of hardware, software, and/or firmware may be used to implement the memory, processing unit, or other components. For example, embodiments of the present invention may be implemented in an electronic spreadsheet application executed on a personal computer. Embodiments of the present invention may be implemented in other computing environments and is not limited to an electronic spreadsheet application.

Figure 2:
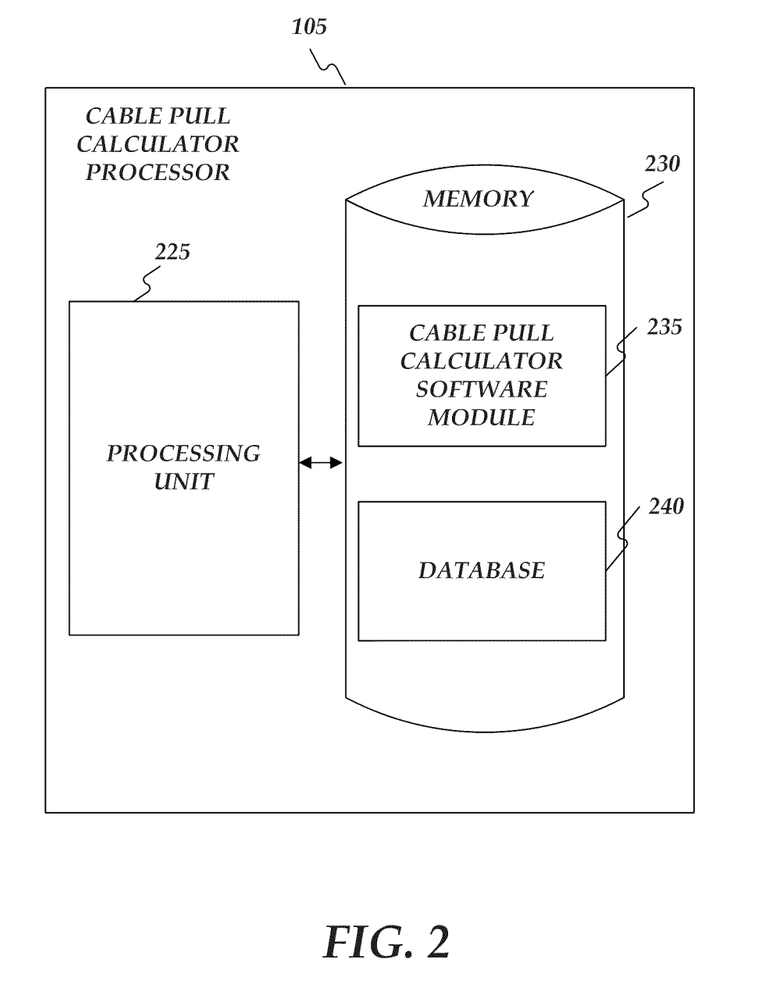
FIG. 2 is another block diagram of the cable pull calculator processor.

FIG. 2 shows cable pull calculator processor 105 of FIG. 1 in more detail. As shown in FIG. 2, cable pull calculator processor 105 may include a processing unit 225 and a memory 230. Memory 230 may include a cable pull calculator software module 235 and a database 240. While executing on processing unit 225, cable pull calculator software module 235 may perform processes for providing cable pull calculations, including, for example, one or more of method 300 stages' as described below with respect to FIG. 3.

Cable pull calculator processor 105 ("the processor") may be implemented using a personal computer, network computer, mainframe, or other similar microcomputer-based workstation. The processor may though comprise any type of computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the processors may comprise other systems or devices.

Figure 3:
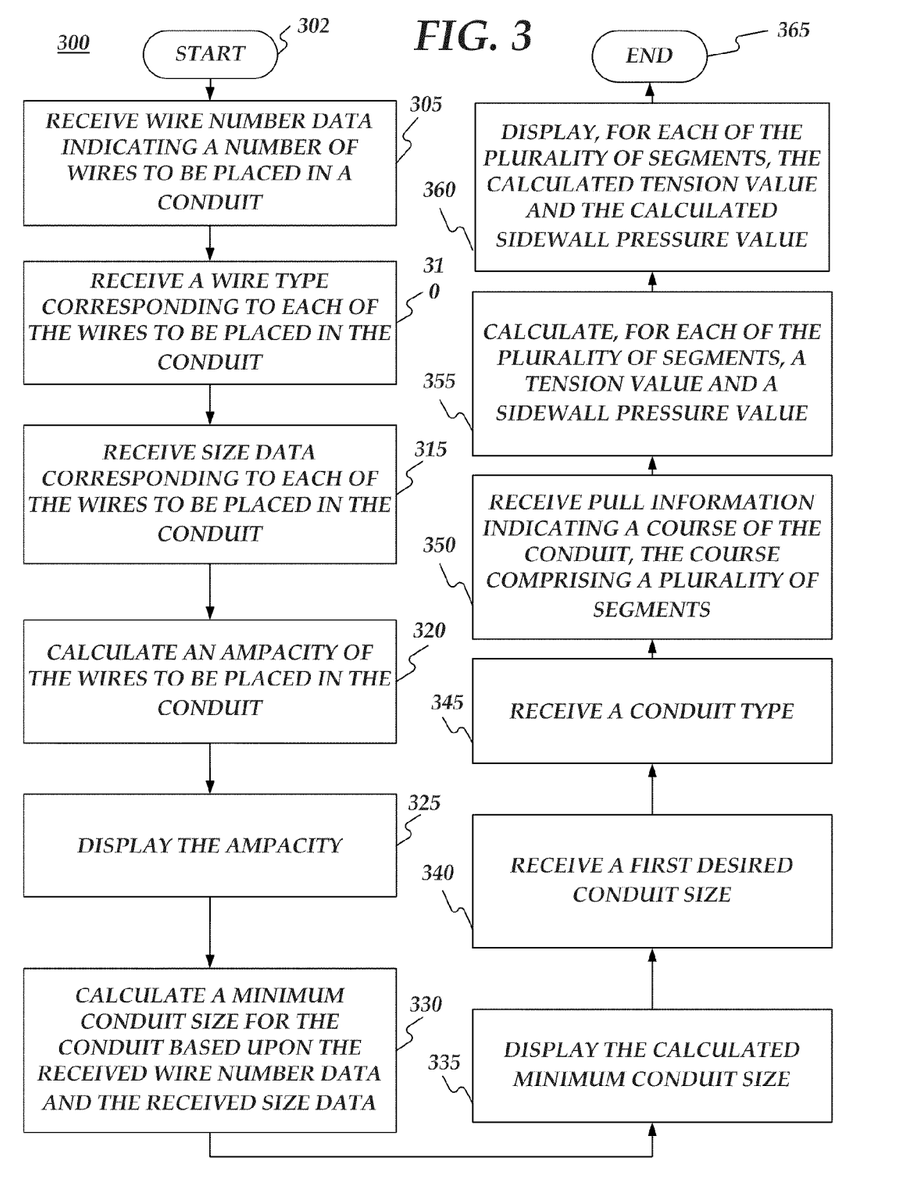
FIG. 3 is a flow chart of a method for providing cable pull calculations.

FIG. 3 is a flow chart setting forth the general stages involved in a method 300 consistent with an embodiment of the invention for providing cable pull calculations. Method 300 may be implemented using cable pull calculator processor 105 as described in more detail above with respect to FIG. 1 and FIG. 2. Ways to implement the stages of method 300 will be described in greater detail below.

Figure 4A:
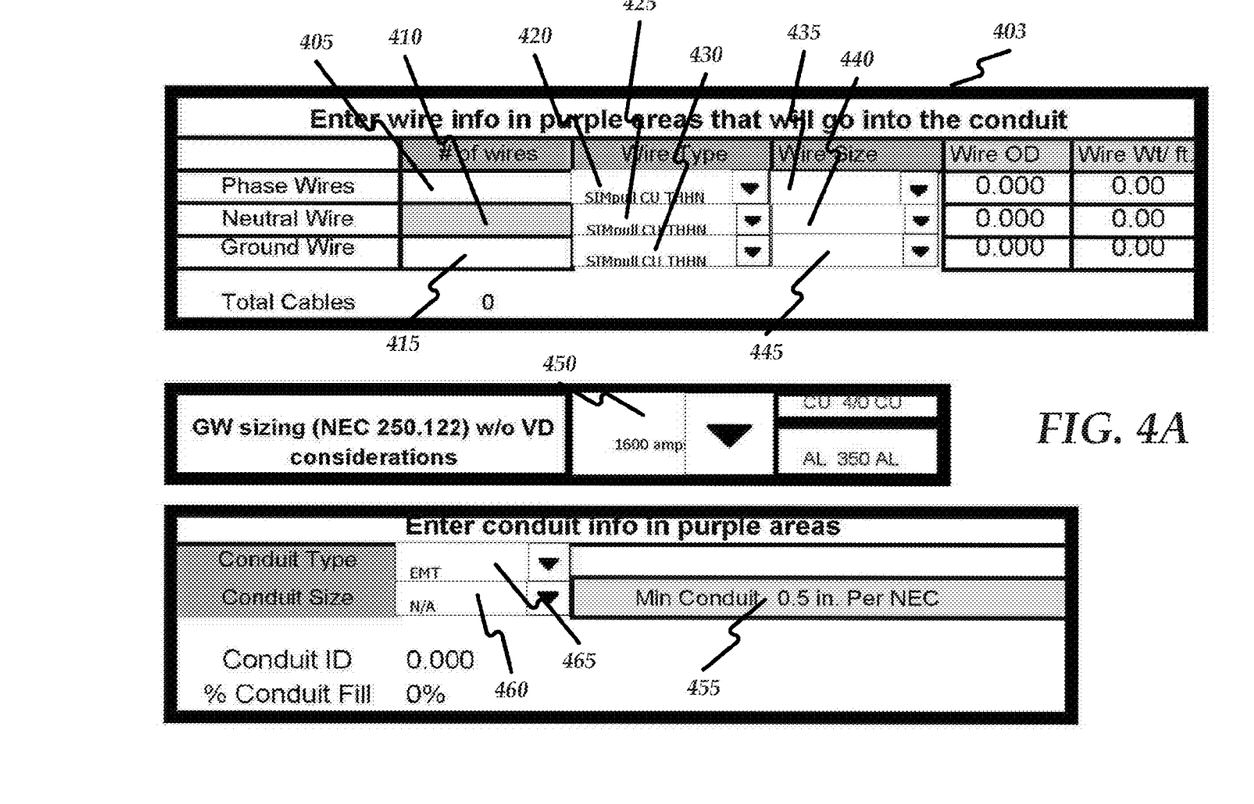
FIG. 4A is a screen shot of a wire input data area.
Figure 4B:
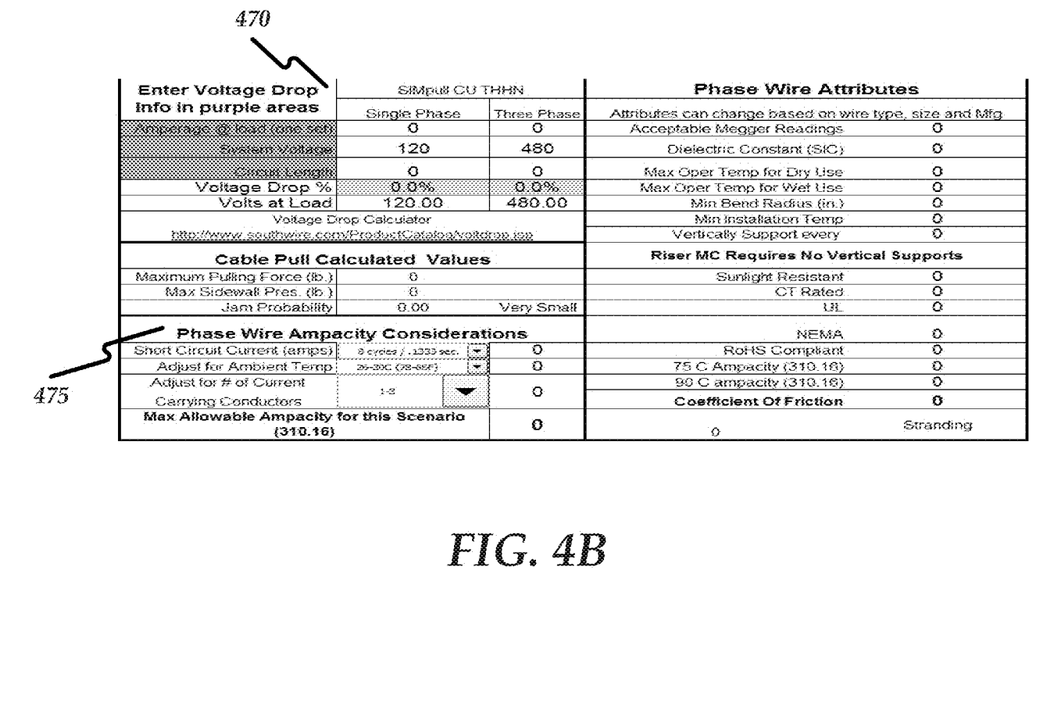
FIG. 4B is a screen shot of a voltage drop output area.

Method 300 may begin at starting block 302 and proceed to stage 305 where cable pull calculator processor 105 may receive wire number data indicating a number of wires to be placed in a conduit. For example, FIG. 4A is a screen shot of a wire input data area in, for example, an electronic spreadsheet. The wire input data area of FIG. 4A may include an input area 403 that may define an overall cable system to be placed in a conduit. In other words, input area 403 may define the cable that is to be pulled in the conduit. As shown in FIG. 4A, a number of phase wires can be received into a phase wire number cell 405, a number of neutral wires can be received into a neutral wire number cell 410, and a number of ground wires can be received into a ground wire number cell 415. The total of these three cells may comprise the number of wires to be pulled in the conduit. FIG. 4B is a screen shot of a voltage drop output area 470 that will be described in greater detail below.

From stage 305, where cable pull calculator processor 105 may receive the wire number data, method 300 may advance to stage 310 where cable pull calculator processor 105 may receive a wire type corresponding to each of the wires to be placed in the conduit. For example, as shown in FIG. 4A, a phase wire type can be received into a phase wire type cell 420, a neutral wire type of can be received into a neutral wire type cell 425, and a ground wire type can be received into a ground wire type cell 430. Each of these wire types can be selected from a drop down list that may be shown by selecting a drop down list button next to the corresponding wire type cells. The wire type selected for any of the phase wires, neutral wires, or ground wires may indicate a type of material the wire's outer jacket is made of, whether the wire's conductors are copper or aluminum, or a type designation. The wire types shown in the drop down list may comprise, but are not limited to, SIMpull® CU THHN, SIMpull® CU XHHW, CU USE, SIMpull® AL THHN, AL XHHW, and AL Use.

Once cable pull calculator processor 105 receives the wire type in stage 310, method 300 may continue to stage 315 where cable pull calculator processor 105 may receive size data corresponding to each of the wires to be placed in the conduit. For example, as shown in FIG. 4A, a phase wire size can be received into a phase wire size cell 435, a neutral wire size of can be received into a neutral wire size cell 440, and a ground wire size can be received into a ground wire size cell 445. Each of these wire sizes can be selected from a drop down list that may be shown by selecting a drop down list button next to the corresponding wire size cells. The wire size may indicate the size of the conductor in the phase wires, neutral wires, or ground wires.

After cable pull calculator processor 105 receives the size data in stage 315, method 300 may proceed to stage 320 where cable pull calculator processor 105 may calculate an ampacity of the wires to be placed in the conduit. For example, given the data received into input area 403 during stages 305, 310, and 315 about the cable to be installed into the conduit, the ampacity of the overall cable system to be placed in the conduit and defined in input area 403 may be calculated based on NEC rules and standards. Or database 240 may include an ampacity table with all possible combinations and the ampacity may be looked up in the ampacity table.

From stage 320, where cable pull calculator processor 105 calculates the ampacity, method 300 may advance to stage 325 where cable pull calculator processor 105 may display the calculated ampacity. For example, the calculated ampacity may be displayed in an ampacity cell 450.

Once cable pull calculator processor 105 displays the ampacity in stage 325, method 300 may continue to stage 330 where cable pull calculator processor 105 may calculate a minimum conduit size for the conduit based upon the received wire number data indicating the number of wires to be placed in the conduit and the received size data corresponding to each of the wires to be placed in the conduit. For example, given the data received into input area 403 during stages 305, 310, and 315 about the cable to be installed into the conduit, the minimum conduit size for the overall cable system to be placed in the conduit and defined in input area 403 may be calculated based on NEC rules and standards. Or database 240 may include a minimum conduit size table with all possible combinations and the minimum conduit size may be looked up in the minimum conduit size table.

After cable pull calculator processor 105 calculates the minimum conduit size in stage 330, method 300 may proceed to stage 335 where cable pull calculator processor 105 may display the calculated minimum conduit size. For example, the calculated minimum conduit size may be displayed in a minimum conduit size cell 455.

From stage 335, where cable pull calculator processor 105 may display the calculated minimum conduit size, method 300 may advance to stage 340 where cable pull calculator processor 105 may receive a first desired conduit size. For example, as shown in FIG. 4A, the first desired conduit size can be received into a first desired conduit size cell 460. For example, a designer may consider the minimum conduit size shown in minimum conduit size cell 455 and select the size shown in minimum conduit size cell 455 or larger. The first desired conduit size can be selected from a drop down list that may be shown by selecting a drop down list button next to first desired conduit size cell 460. This drop down list may show all conduit sizes starting with the size shown in minimum conduit size cell 455 and larger.

Once cable pull calculator processor 105 receives the first desired conduit size in stage 340, method 300 may continue to stage 345 where cable pull calculator processor 105 may receive a conduit type. For example, as shown in FIG. 4A, the conduit type can be received into a conduit type cell 465. The conduit type can be selected from a drop down list that may be shown by selecting a drop down list button next to conduit type cell 465. This drop down list may show standard conduit types comprising, but not limited to, EMT, PVC Sch 40

HDPE, PVC Sch 80, Flex FMC, GRC, Flex LFMC, Flex LFMC, Flex LFNC-B, and IMC.

After cable pull calculator processor 105 receives the conduit type in stage 345, method 300 may proceed to stage 350 where cable pull calculator processor 105 may receive pull information indicating a course of the conduit. For example, a designer may want to pull a cable or cables through a conduit having a starting point "A" and an ending point "B". The conduit may run a certain course between point "A" and point "B" having a plurality of segments. Each of the segments may have a straight section that may be horizontal, vertical, or any angle between. Also, each of the segments may have a bend section that may sweep up, down, left, right, or in any direction at a certain angle through a certain sweep distance.

Figure 5:
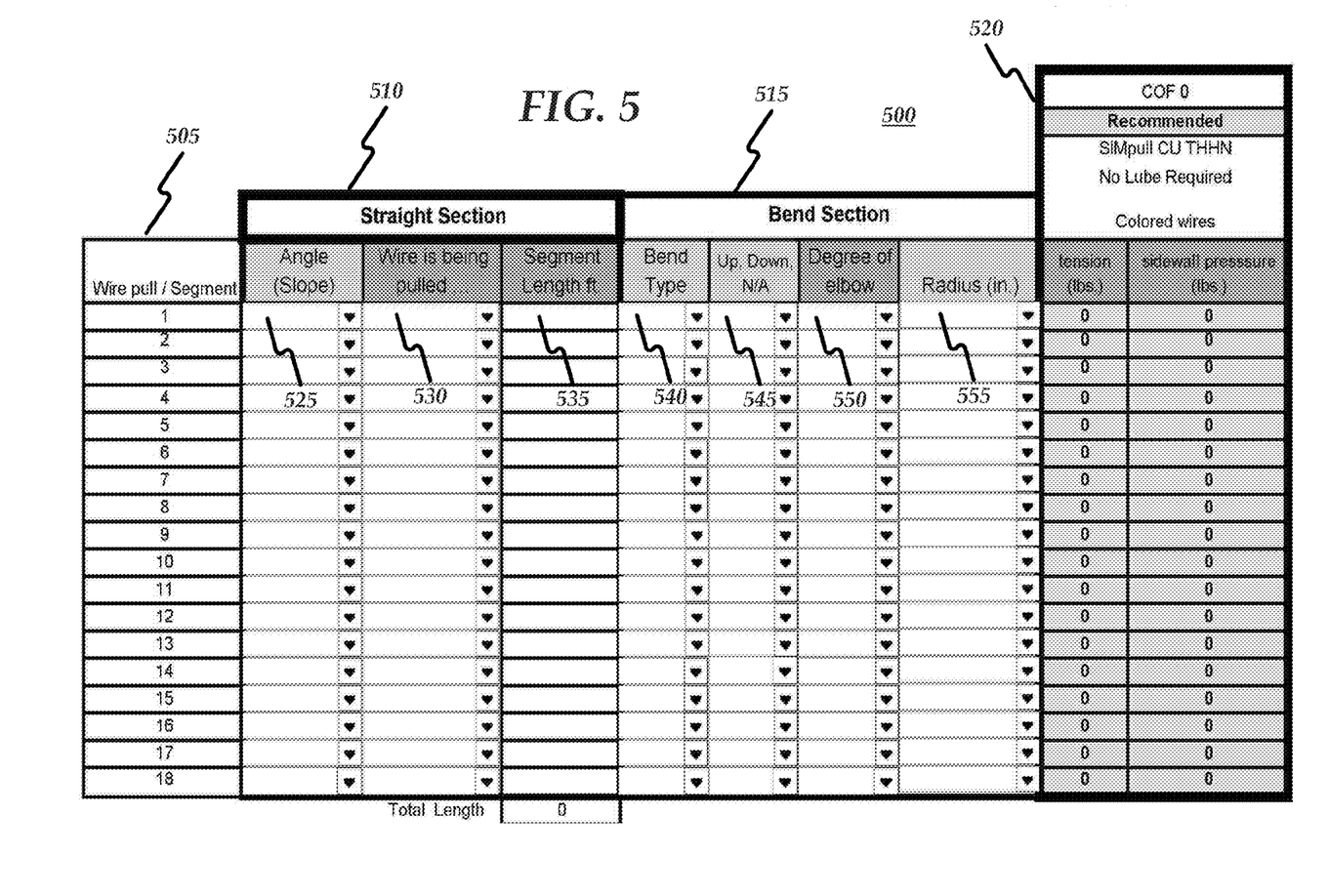
FIG. 5 is a screen shot of a conduit course input/out data area.

FIG. 5 is a screen shot of a conduit course input/output data area 500. Cable pull calculator processor 105 may receive pull information indicating the course of the conduit through conduit course input/output data area 500. Conduit course input/output data area 500 may receive data that may define the course of the conduit as it runs from point "A" to point "B". For example, conduit course input/out data area 500 may comprise a segment column 505, a straight section portion 510, a bend section portion 515, and an output section 520. Segment column 505 may number each segment of the conduit course into a corresponding row.

For each row designated with a segment number in segment column 505, there are three cells in straight section portion 510 and four cells in bent section portion 515. The three cells in straight section portion 510 may comprise an angle cell 525, a wire direction cell 530, and a segment length cell 535. For a given segment, angle cell 525 may receive an angle at which the corresponding straight section is at. The angle may be selected from a drop down list that may be shown by selecting a drop down list button next to angle cell 525. Also, for a given segment, wire direction cell 530 may receive a direction at which the corresponding straight section is at. The direction (e.g. horizontal, up, down) may be selected from a drop down list that may be shown by selecting a drop down list button next to wire direction cell 530. In addition, for a given segment, segment length cell 535 may receive the length of the corresponding straight section.

The four cells in bent section portion 515 may comprise a bend type cell 540, a bend direction cell 545, a degree of bend cell 550, and a bend radius cell 555. For a given segment, bend type cell 540 may receive a bend type at which the corresponding bend section is at. The bend type may be selected from a drop down list that may be shown by selecting a drop down list button next to bend type cell 540. The bend type may comprise, but is not limited to, horizontal, vertical up, and vertical down. Furthermore, for a given segment, bend direction cell 545 may receive a bend direction at which the corresponding bend section is at. The bend direction may be selected from a drop down list that may be shown by selecting a drop down list button next to bend direction cell 545. The bend direction may comprise, but is not limited to, up and down.

In addition, for a given segment, degree of bend cell 550 may receive a degree of bend at which the corresponding bend section is at. The degree of bend may be selected from a drop down list that may be shown by selecting a drop down list button next to degree of bend cell 550. The degree of bend may comprise, but is not limited to, any number between 10 and 90 inclusive. Similarly, for a given segment, bend radius cell 555 may receive a bend radius at which the corresponding bend section is at. The bend radius may be selected from a drop down list that may be shown by selecting a drop down list button next to bend radius cell 555. The bend radius may comprise, but is not limited to, standard, 12 in., 15 in., 18 in., 24 in., 36 in., 42 in., and 48 in.

From stage 350, where cable pull calculator processor 105 may receive the pull information through conduit course input/output data area 500, method 300 may advance to stage 355 where cable pull calculator processor 105 may calculate, for each of the plurality of segments, a tension value and a sidewall pressure value. This calculation may be based at least on any one or more of the conduit type, the first desired conduit size, the received wire type, the received size data, and the received pull information. Depending upon, for example: i) the shape and length of the conduit course; ii) the conduit type; iii) the conduit size; iv) the size of the cable being pulled in the conduit; and v) the type of material the phase wires', neutral wires', and ground wires' outer jackets are made of, the cable may be pulled through the conduit from point "A" to point "B" within safe limits as determined, for example, by the manufacturer of the cable being pulled. Consistent with embodiments of the invention, cable pull calculator processor 105 may calculate, for each of the plurality of segments, a tension value and a sidewall pressure value for the cable to be pulled in the conduit based on the parameters described above.

Figure 6:
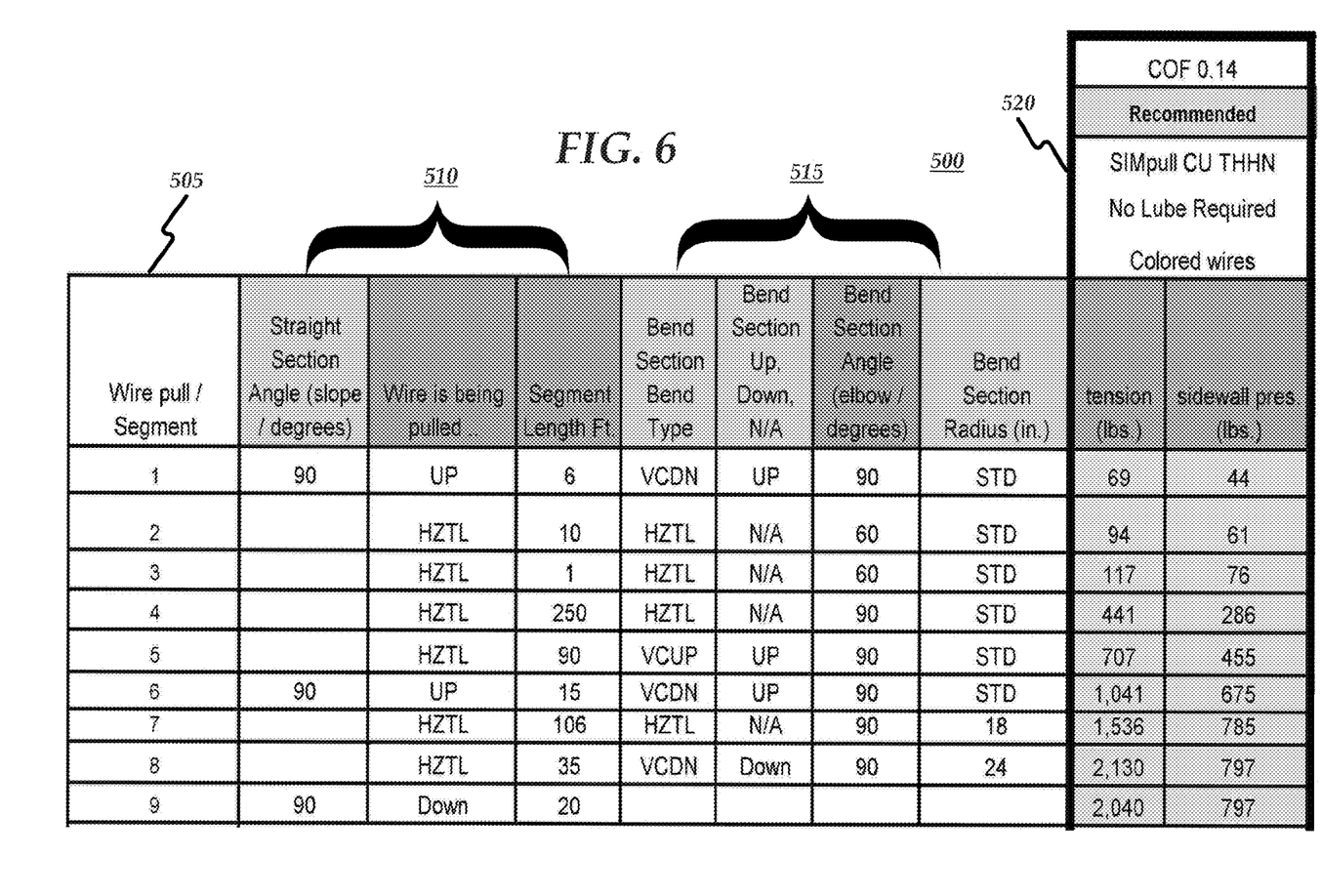
FIG. 6 is a screen shot of a populated conduit course input/out data area.

Once cable pull calculator processor 105 calculates the tension values and the sidewall pressure values in stage 355, method 300 may continue to stage 360 where cable pull calculator processor 105 may display, for each of the plurality of segments, the calculated tension value and the calculated sidewall pressure value. The aforementioned tension values and a sidewall pressure values for each corresponding segment may be displayed in output section 520 of conduit course input/output data area 500. For each of the plurality of segments the displayed calculated tension value may indicate when a maximum tension for the wires has been exceeded. Similarly, the displayed calculated sidewall pressure value may indicate when a maximum sidewall pressure for the wires has been exceeded. The maximum tension and the maximum sidewall pressure may be determined or otherwise specified by a manufacturer of the cable being pulled. FIG. 6 shows an example of conduit course input/out data area 500 populated with input data in segment column 505, straight section portion 510, and bend section portion 515, and with output in output section 520.

Consistent with embodiments of the invention, when the displayed calculated tension value or the displayed maximum sidewall pressure exceeds limits set by the manufacturer of the cable being pulled, these exceeded values may be display in a manner different from values that do not exceed the limits set by the manufacturer of the cable being pulled. For example, the values that exceed the manufacturer's limits may be displayed in a different color (e.g. red) than the values that do not exceed the manufacturer's limits (e.g. green.) Consequently, with embodiments of the invention, a cable pull calculator may be provided that my show a designer if the safe limits have been exceeded. Once cable pull calculator processor 105 displays the calculated tension values and the calculated sidewall pressure values in stage 360, method 300 may then end at stage 365.

Figure 7:
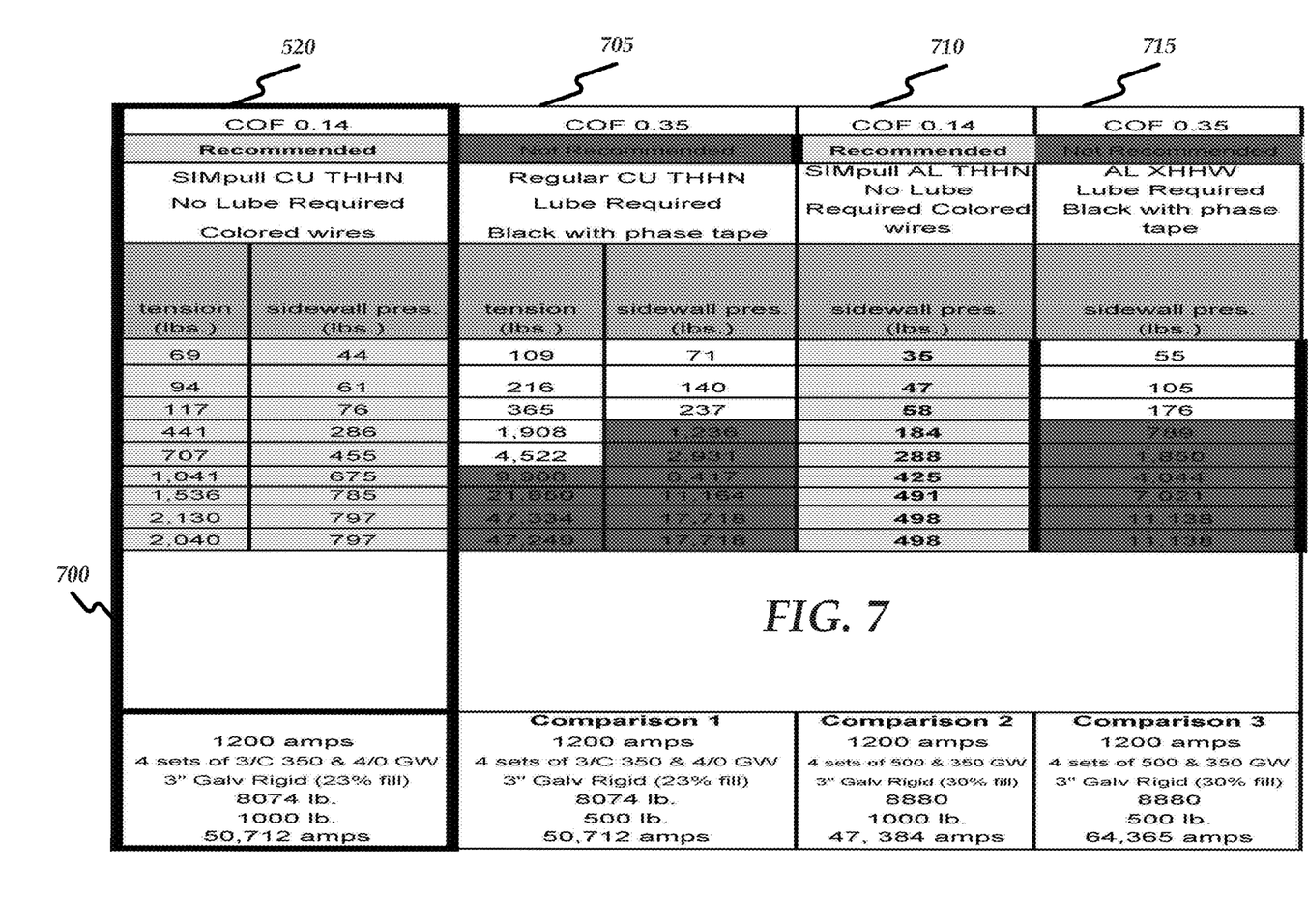
FIG. 7 is a screen shot of an alternative wire data output area.

FIG. 7 is a screen shot of an alternative wire data output area 700. Consistent with embodiments of the invention, for each of the plurality of segments, alternative tension values and an alternative sidewall pressure values for alternative wire types may be calculated and displayed. For example, cable pull calculator processor 105 may display alternative wire data output area 700 including output section 520 along with a first alternative wire section 705, a second alternative wire section 710, and a third alternative wire section 715. Consistent with embodiments of the invention, when the displayed alternative calculated tension values or the displayed alternative maximum sidewall pressures exceeds the manufacturer's limits, these exceeded values may be display in a manner different from values that do not exceed the manufacturer's limits. For example, the alternative values that exceed the manufacturer's limits may be displayed in a different color (e.g. red) than the values that do not exceed the manufacturer's limits (e.g. green.) Consequently, with embodiments of the invention, a cable pull calculator may be provided that my show a designer if the safe limits have been exceeded even for alternative wires.

Furthermore, consistent with embodiments of the invention, calculator processor 105 may receive an updated wire type and recalculate, and redisplay the recalculate tension values and the recalculate sidewall pressure values. For example, after going through the stages of method 300, the designer may decide to change one or more of the phase wires, neutral wires, or ground wires from copper to aluminum. As another example, the designer may decide to change one or more of the phase wires, neutral wires, or ground wires from ones having outer jackets made of one material to ones of another material. Specially, the designer may decide to change one or more of the phase wires if the voltage drop is exceeded on an initial design. As stated above, FIG. 4B is a screen shot of voltage drop output area 470. Consistent with embodiments of the invention voltage drop calculations may be performed and displayed for both single phase and three phase voltage drop output area 470. The information displayed in voltage drop output area 470 may cause the designer to select a different size wire after he enters his wire pull that may give him the circuit length and he automatically sees this info.

Furthermore, the designer may decide to change one or more of the phase wires based on ampacity considerations as shown in ampacity considerations area 475. This may provide an important design consideration especially if ampacity adjustments come into play with the designer. For example, any one value may cause the designer to select an alternate cable type or size other than the initial first choice, thus keeping everything safe and NEC compliant.

Regardless of the received updated wire type, embodiments of the invention may assume that the ampacity of the originally defined cable to be place in the conduit as set out in stages of method 300 is to be substantially the ampacity of the cable defined in this recalculation. In other words, updated size data may be calculated. For example, if the original wire type included copper conductors and the updated wire type called for aluminum, embodiments of the invention may move up the size of the wires so that they could deliver substantially the same ampacity of the original copper wires. Similarly, if the original wire type included aluminum conductors and the updated wire type called for copper, embodiments of the invention may move down the size of the wires so that they could deliver substantially the same ampacity of the original aluminum wires.

Next, the minimum conduit size for the conduit may be recalculated based upon the wire number data indicating the number of wires to be placed in the conduit and the calculated updated size data corresponding to each of the wires to be placed in the conduit. The recalculated minimum conduit size may be displayed and a second desired conduit size may be received. Next, for each of the plurality of segments, an updated tension value and an updated sidewall pressure value may be calculated based at least on the conduit type, the second desired conduit size, the received updated wire type, and the calculated updated size data. The updated tension values and an updated sidewall pressure values may then be displayed.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as show in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While certain embodiments of the invention have been described, other embodiments may exist. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing cable pull calculations, the method comprising:
   receiving wire number data indicating a number of wires to be placed in a conduit wherein receiving the wire number data indicating the number of wires to be placed in the conduit comprises receiving the wire number data indicating the number of wires to be placed in the conduit wherein the wires comprise at least two wires wherein the at least two wires comprise a phase wire and a neutral wire;
   receiving a wire type corresponding to each of the wires to be placed in the conduit;
   receiving size data corresponding to each of the wires to be placed in the conduit;
   calculating, by a computer, an ampacity of the wires to be placed in the conduit;
   displaying the ampacity;
   calculating a minimum conduit size for the conduit based upon the received wire number data indicating the number of wires to be placed in the conduit and the received size data corresponding to each of the wires to be placed in the conduit;
   displaying the calculated minimum conduit size;
   receiving a first desired conduit size;
   receiving a conduit type;
   receiving pull information indicating a course of the conduit, the course comprising a plurality of segments, each of the plurality of segments comprising at least one of the following: a straight section and a bend section;
   calculating, for each of the plurality of segments, a tension value and a sidewall pressure value based at least on the conduit type, the first desired conduit size, the received wire type, the received size data, and the received pull information; and
   displaying, for each of the plurality of segments, the calculated tension value and the calculated sidewall pressure value, wherein for each of the plurality of segments,
      the displayed calculated tension value indicates when a maximum tension for the wires has been exceeded, and
      the displayed calculated sidewall pressure value indicates when a maximum sidewall pressure for the wires has been exceeded.

2. The method of claim 1, further comprising:
   receiving an updated wire type corresponding to each of the wires to be placed in the conduit;
   calculating updated size data corresponding to each of the wires to be placed in the conduit, the updated size data being configured to cause the wires to deliver approximately the calculated ampacity;
   recalculating the minimum conduit size for the conduit based upon the wire number data indicating the number of wires to be placed in the conduit and the calculated updated size data corresponding to each of the wires to be placed in the conduit;
   displaying the recalculated minimum conduit size;
   receiving a second desired conduit size;
   calculating, for each of the plurality of segments, an updated tension value and an updated sidewall pressure value based at least on the conduit type, the second desired conduit size, the received updated wire type, and the calculated updated size data; and
   displaying, for each of the plurality of segments, the calculated updated tension value and the calculated updated sidewall pressure value, wherein for each of the plurality of segments,
      the calculated updated tension value indicates when the maximum tension for the wires has been exceeded, and
      the calculated updated sidewall pressure value indicates when the maximum sidewall pressure for the wires has been exceeded.

3. The method of claim 1, further comprising displaying, for each of the plurality of segments, an alternative tension value and an alternative sidewall pressure value for an alternative wire type.

4. The method of claim 3, further comprising indicating that the alternative wire type is not recommended when one of the alternative tension value and the alternative sidewall pressure value for any of the plurality of segments exceeds a predetermined value.

5. The method of claim 1, wherein the calculations are based on the national electric code (NEC).

6. A non-transitory computer-readable medium that stores a set of instructions which when executed perform a method for providing cable pull calculations, the method executed by the set of instructions comprising:
   receiving wire number data indicating a number of wires to be placed in a conduit wherein receiving the wire number data indicating the number of wires to be placed in the conduit comprises receiving the wire number data indicating the number of wires to be placed in the conduit wherein the wires comprise at least two wires wherein the at least two wires comprise a phase wire and a neutral wire;

receiving a wire type corresponding to each of the wires to be placed in the conduit;
receiving size data corresponding to each of the wires to be placed in the conduit;
calculating a minimum conduit size for the conduit based upon the received wire number data indicating the number of wires to be placed in the conduit and the received size data corresponding to each of the wires to be placed in the conduit;
displaying the calculated minimum conduit size;
receiving a first desired conduit size;
receiving a conduit type;
receiving pull information indicating a course of the conduit, the course comprising a plurality of segments, each of the plurality of segments comprising at least one of the following: a straight section and a bend section;
calculating, for each of the plurality of segments, a tension value and a sidewall pressure value based at least on the conduit type, the first desired conduit size, the received wire type, and the received size data; and
displaying, for each of the plurality of segments, the calculated tension value and the calculated sidewall pressure value, wherein for each of the plurality of segments,
the displayed calculated tension value indicates when a maximum tension for the wires has been exceeded, and
the displayed calculated sidewall pressure value indicates when a maximum sidewall pressure for the wires has been exceeded.

7. The non-transitory computer-readable medium of claim 6, further comprising:
calculating an ampacity of the wires to be placed in the conduit; and
displaying the ampacity.

8. The non-transitory computer-readable medium of claim 7, further comprising:
receiving an updated wire type corresponding to each of the wires to be placed in the conduit;
calculating updated size data corresponding to each of the wires to be placed in the conduit, the updated size data being configured to cause the wires to deliver approximately the calculated ampacity;
recalculating the minimum conduit size for the conduit based upon the wire number data indicating the number of wires to be placed in the conduit and the calculated updated size data corresponding to each of the wires to be placed in the conduit;
displaying the recalculated minimum conduit size;
receiving a second desired conduit size;
calculating, for each of the plurality of segments, an updated tension value and an updated sidewall pressure value based at least on the conduit type, the second desired conduit size, the received updated wire type, and the calculated updated size data; and
displaying, for each of the plurality of segments, the calculated updated tension value and the calculated updated sidewall pressure value, wherein for each of the plurality of segments,
the calculated updated tension value indicates when the maximum tension for the wires has been exceeded, and
the calculated updated sidewall pressure value indicates when the maximum sidewall pressure for the wires has been exceeded.

9. The non-transitory computer-readable medium of claim 6, further comprising displaying, for each of the plurality of segments, an alternative tension value and an alternative sidewall pressure value for an alternative wire type.

10. The non-transitory computer-readable medium of claim 9, further comprising indicating that the alternative wire type is not recommended when one of the alternative tension value and the alternative sidewall pressure value for any of the plurality of segments exceeds a predetermined value.

11. The non-transitory computer-readable medium of claim 6, wherein the calculations are based on the national electric code (NEC).

12. A system for providing cable pull calculations, the system comprising:
a memory storage; and
a processing unit coupled to the memory storage, wherein the processing unit is operative to:
receive wire number data indicating a number of wires to be placed in a conduit wherein the processing unit being operative to receive the wire number data indicating the number of wires to be placed in the conduit comprises the processing unit being operative to receive the wire number data indicating the number of wires to be placed in the conduit wherein the wires comprise at least two wires wherein the at least two wires comprise a phase wire and a neutral wire;
receive a wire type corresponding to each of the wires to be placed in the conduit;
receive size data corresponding to each of the wires to be placed in the conduit;
calculate a minimum conduit size for the conduit based upon the received wire number data indicating the number of wires to be placed in the conduit and the received size data corresponding to each of the wires to be placed in the conduit;
display the calculated minimum conduit size;
receive a first desired conduit size;
receive a conduit type;
receive pull information indicating a course of the conduit, the course comprising a plurality of segments, each of the plurality of segments comprising at least one of the following: a straight section and a bend section;
calculate, for each of the plurality of segments, a tension value and a sidewall pressure value based at least on the conduit type, the first desired conduit size, the received wire type, and the received size data; and
display, for each of the plurality of segments, the calculated tension value and the calculated sidewall pressure value, wherein for each of the plurality of segments,
the displayed calculated tension value indicates when a maximum tension for the wires has been exceeded, and
the displayed calculated sidewall pressure value indicates when a maximum sidewall pressure for the wires has been exceeded.

13. The system of claim 12, wherein the processing unit is further operative to:
calculate an ampacity of the wires to be placed in the conduit; and
display the ampacity.

14. The system of claim 13, wherein the processing unit is further operative to:
receive an updated wire type corresponding to each of the wires to be placed in the conduit;
calculate updated size data corresponding to each of the wires to be placed in the conduit, the updated size data being configured to cause the wires to deliver approximately the calculated ampacity;

recalculate the minimum conduit size for the conduit based upon the wire number data indicating the number of wires to be placed in the conduit and the calculated updated size data corresponding to each of the wires to be placed in the conduit;

display the recalculated minimum conduit size;

receive a second desired conduit size;

calculate, for each of the plurality of segments, an updated tension value and an updated sidewall pressure value based at least on the conduit type, the second desired conduit size, the received updated wire type, and the calculated updated size data; and display, for each of the plurality of segments, the calculated updated tension value and the calculated updated sidewall pressure value, wherein for each of the plurality of segments, the calculated updated tension value indicates when the maximum tension for the wires has been exceeded, and the calculated updated sidewall pressure value indicates when the maximum sidewall pressure for the wires has been exceeded.

15. The system claim 13, wherein the processing unit is further operative to calculate and display a minimum ground wire size for both copper and aluminum wire based on the calculated ampacity.

16. The system of claim 12, wherein the processing unit is further operative to display, for each of the plurality of segments, an alternative tension value and an alternative sidewall pressure value for an alternative wire type.

17. The system claim 16, wherein the processing unit is further operative to indicate that the alternative wire type is not recommended when one of the alternative tension value and the alternative sidewall pressure value for any of the plurality of segments exceeds a predetermined value.

18. A method for providing cable pull calculations, the method comprising:

receiving wire number data indicating a number of wires to be placed in a conduit;

receiving a wire type corresponding to each of the wires to be placed in the conduit;

receiving size data corresponding to each of the wires to be placed in the conduit;

calculating, by a computer, an ampacity of the wires to be placed in the conduit;

displaying the ampacity;

calculating a minimum conduit size for the conduit based upon the received wire number data indicating the number of wires to be placed in the conduit and the received size data corresponding to each of the wires to be placed in the conduit;

displaying the calculated minimum conduit size;

receiving a first desired conduit size;

receiving a conduit type;

receiving pull information indicating a course of the conduit, the course comprising a plurality of segments, each of the plurality of segments comprising at least one of the following: a straight section and a bend section;

calculating, for each of the plurality of segments, a tension value and a sidewall pressure value based at least on the conduit type, the first desired conduit size, the received wire type, the received size data, and the received pull information;

displaying, for each of the plurality of segments, the calculated tension value and the calculated sidewall pressure value, wherein for each of the plurality of segments, the displayed calculated tension value indicates when a maximum tension for the wires has been exceeded, and the displayed calculated sidewall pressure value indicates when a maximum sidewall pressure for the wires has been exceeded, displaying, for each of the plurality of segments, an alternative tension value and an alternative sidewall pressure value for an alternative wire type; and indicating that the alternative wire type is not recommended when one of the alternative tension value and the alternative sidewall pressure value for any of the plurality of segments exceeds a predetermined value.

19. The method of claim 18, further comprising:

receiving an updated wire type corresponding to each of the wires to be placed in the conduit;

calculating updated size data corresponding to each of the wires to be placed in the conduit, the updated size data being configured to cause the wires to deliver approximately the calculated ampacity;

recalculating the minimum conduit size for the conduit based upon the wire number data indicating the number of wires to be placed in the conduit and the calculated updated size data corresponding to each of the wires to be placed in the conduit;

displaying the recalculated minimum conduit size;

receiving a second desired conduit size;

calculating, for each of the plurality of segments, an updated tension value and an updated sidewall pressure value based at least on the conduit type, the second desired conduit size, the received updated wire type, and the calculated updated size data; and displaying, for each of the plurality of segments, the calculated updated tension value and the calculated updated sidewall pressure value, wherein for each of the plurality of segments, the calculated updated tension value indicates when the maximum tension for the wires has been exceeded, and the calculated updated sidewall pressure value indicates when the maximum sidewall pressure for the wires has been exceeded.

20. The method of claim 18, wherein the calculations are based on the national electric code (NEC).

21. The method of claim 18, wherein receiving the wire number data indicating the number of wires to be placed in the conduit comprises receiving the wire number data indicating the number of wires to be placed in the conduit wherein the wires comprise a phase wire and a neutral wire.

22. A non-transitory computer-readable medium that stores a set of instructions which when executed perform a method for providing cable pull calculations, the method executed by the set of instructions comprising:

receiving wire number data indicating a number of wires to be placed in a conduit;

receiving a wire type corresponding to each of the wires to be placed in the conduit;

receiving size data corresponding to each of the wires to be placed in the conduit;

calculating a minimum conduit size for the conduit based upon the received wire number data indicating the number of wires to be placed in the conduit and the received size data corresponding to each of the wires to be placed in the conduit;

displaying the calculated minimum conduit size;

receiving a first desired conduit size;
receiving a conduit type;
receiving pull information indicating a course of the conduit, the course comprising a plurality of segments, each of the plurality of segments comprising at least one of the following: a straight section and a bend section;
calculating, for each of the plurality of segments, a tension value and a sidewall pressure value based at least on the conduit type, the first desired conduit size, the received wire type, and the received size data;
displaying, for each of the plurality of segments, the calculated tension value and the calculated sidewall pressure value, wherein for each of the plurality of segments,
the displayed calculated tension value indicates when a maximum tension for the wires has been exceeded, and
the displayed calculated sidewall pressure value indicates when a maximum sidewall pressure for the wires has been exceeded;
displaying, for each of the plurality of segments, an alternative tension value and an alternative sidewall pressure value for an alternative wire type; and
indicating that the alternative wire type is not recommended when one of the alternative tension value and the alternative sidewall pressure value for any of the plurality of segments exceeds a predetermined value.

23. The non-transitory computer-readable medium of claim 22, further comprising:
calculating an ampacity of the wires to be placed in the conduit; and
displaying the ampacity.

24. The non-transitory computer-readable medium of claim 23, further comprising:
receiving an updated wire type corresponding to each of the wires to be placed in the conduit;
calculating updated size data corresponding to each of the wires to be placed in the conduit, the updated size data being configured to cause the wires to deliver approximately the calculated ampacity;
recalculating the minimum conduit size for the conduit based upon the wire number data indicating the number of wires to be placed in the conduit and the calculated updated size data corresponding to each of the wires to be placed in the conduit;
displaying the recalculated minimum conduit size;
receiving a second desired conduit size;
calculating, for each of the plurality of segments, an updated tension value and an updated sidewall pressure value based at least on the conduit type, the second desired conduit size, the received updated wire type, and the calculated updated size data; and
displaying, for each of the plurality of segments, the calculated updated tension value and the calculated updated sidewall pressure value, wherein for each of the plurality of segments,
the calculated updated tension value indicates when the maximum tension for the wires has been exceeded, and
the calculated updated sidewall pressure value indicates when the maximum sidewall pressure for the wires has been exceeded.

25. The non-transitory computer-readable medium of claim 22, wherein the calculations are based on the national electric code (NEC).

26. The non-transitory computer-readable medium of claim 22, wherein receiving the wire number data indicating the number of wires to be placed in the conduit comprises receiving the wire number data indicating the number of wires to be placed in the conduit wherein the wires comprise a phase wire and a neutral wire.

27. A system for providing cable pull calculations, the system comprising:
a memory storage; and
a processing unit coupled to the memory storage, wherein the processing unit is operative to:
receive wire number data indicating a number of wires to be placed in a conduit;
receive a wire type corresponding to each of the wires to be placed in the conduit;
receive size data corresponding to each of the wires to be placed in the conduit;
calculate a minimum conduit size for the conduit based upon the received wire number data indicating the number of wires to be placed in the conduit and the received size data corresponding to each of the wires to be placed in the conduit;
display the calculated minimum conduit size;
receive a first desired conduit size;
receive a conduit type;
receive pull information indicating a course of the conduit, the course comprising a plurality of segments, each of the plurality of segments comprising at least one of the following: a straight section and a bend section;
calculate, for each of the plurality of segments, a tension value and a sidewall pressure value based at least on the conduit type, the first desired conduit size, the received wire type, and the received size data;
display, for each of the plurality of segments, the calculated tension value and the calculated sidewall pressure value, wherein for each of the plurality of segments,
the displayed calculated tension value indicates when a maximum tension for the wires has been exceeded, and
the displayed calculated sidewall pressure value indicates when a maximum sidewall pressure for the wires has been exceeded;
calculate an ampacity of the wires to be placed in the conduit;
display the ampacity; and
calculate and display a minimum ground wire size for both copper and aluminum wire based on the calculated ampacity.

28. The system of claim 27, wherein the processing unit is further operative to:
receive an updated wire type corresponding to each of the wires to be placed in the conduit;
calculate updated size data corresponding to each of the wires to be placed in the conduit, the updated size data being configured to cause the wires to deliver approximately the calculated ampacity;
recalculate the minimum conduit size for the conduit based upon the wire number data indicating the number of wires to be placed in the conduit and the calculated updated size data corresponding to each of the wires to be placed in the conduit;
display the recalculated minimum conduit size;
receive a second desired conduit size;
calculate, for each of the plurality of segments, an updated tension value and an updated sidewall pressure value based at least on the conduit type, the second desired conduit size, the received updated wire type, and the calculated updated size data; and display, for each of the plurality of segments, the calculated updated tension value and the calculated updated sidewall pressure value, wherein for each of the plurality of segments, the calculated updated tension value indicates when the maximum tension for the wires has been exceeded, and the calculated updated sidewall pressure value indicates when the maximum sidewall pressure for the wires has been exceeded.

29. The system of claim 27, wherein the processing unit is further operative to display, for each of the plurality of segments, an alternative tension value and an alternative sidewall pressure value for an alternative wire type.

30. The system claim 29, wherein the processing unit is further operative to indicate that the alternative wire type is not recommended when one of the alternative tension value and the alternative sidewall pressure value for any of the plurality of segments exceeds a predetermined value.

31. The system claim 27, wherein the processing unit being operative to receive the wire number data indicating the number of wires to be placed in the conduit comprises the processing unit being operative to receive the wire number data indicating the number of wires to be placed in the conduit wherein the wires comprise a phase wire and a neutral wire.

32. A system for providing cable pull calculations, the system comprising:
a memory storage; and
a processing unit coupled to the memory storage, wherein the processing unit is operative to:
receive wire number data indicating a number of wires to be placed in a conduit;
receive a wire type corresponding to each of the wires to be placed in the conduit;
receive size data corresponding to each of the wires to be placed in the conduit;
calculate a minimum conduit size for the conduit based upon the received wire number data indicating the number of wires to be placed in the conduit and the received size data corresponding to each of the wires to be placed in the conduit;
display the calculated minimum conduit size;
receive a first desired conduit size;
receive a conduit type;
receive pull information indicating a course of the conduit, the course comprising a plurality of segments, each of the plurality of segments comprising at least one of the following: a straight section and a bend section;
calculate, for each of the plurality of segments, a tension value and a sidewall pressure value based at least on the conduit type, the first desired conduit size, the received wire type, and the received size data; and
display, for each of the plurality of segments, the calculated tension value and the calculated sidewall pressure value, wherein for each of the plurality of segments,
the displayed calculated tension value indicates when a maximum tension for the wires has been exceeded, and
the displayed calculated sidewall pressure value indicates when a maximum sidewall pressure for the wires has been exceeded;
display, for each of the plurality of segments, an alternative tension value and an alternative sidewall pressure value for an alternative wire type; and
indicate that the alternative wire type is not recommended when one of the alternative tension value and the alternative sidewall pressure value for any of the plurality of segments exceeds a predetermined value.

33. The system of claim 32, wherein the processing unit is further operative to:
calculate an ampacity of the wires to be placed in the conduit; and
display the ampacity.

34. The system of claim 33, wherein the processing unit is further operative to:
receive an updated wire type corresponding to each of the wires to be placed in the conduit;
calculate updated size data corresponding to each of the wires to be placed in the conduit, the updated size data being configured to cause the wires to deliver approximately the calculated ampacity;
recalculate the minimum conduit size for the conduit based upon the wire number data indicating the number of wires to be placed in the conduit and the calculated updated size data corresponding to each of the wires to be placed in the conduit;
display the recalculated minimum conduit size;
receive a second desired conduit size;
calculate, for each of the plurality of segments, an updated tension value and an updated sidewall pressure value based at least on the conduit type, the second desired conduit size, the received updated wire type, and the calculated updated size data; and
display, for each of the plurality of segments, the calculated updated tension value and the calculated updated sidewall pressure value, wherein for each of the plurality of segments,
the calculated updated tension value indicates when the maximum tension for the wires has been exceeded, and
the calculated updated sidewall pressure value indicates when the maximum sidewall pressure for the wires has been exceeded.

35. The system claim 33, wherein the processing unit is further operative to calculate and display a minimum ground wire size for both copper and aluminum wire based on the calculated ampacity.

36. The system claim 32, wherein the processing unit being operative to receive the wire number data indicating the number of wires to be placed in the conduit comprises the processing unit being operative to receive the wire number data indicating the number of wires to be placed in the conduit wherein the wires comprise a phase wire and a neutral wire.

37. A method for providing cable pull calculations, the method comprising:
receiving, by a processing unit, a wire type corresponding to a first wire to be placed in a conduit wherein the first wire comprises a phase wire;
receiving, by the processing unit, size data corresponding to the first wire to be placed in the conduit;
receiving, by the processing unit, wire number data indicating a number of the first wire to be placed in the conduit;
calculating, by the processing unit, a minimum conduit size for the conduit based, at least in part, upon the wire number data received indicating the number of the first wire to be placed in the conduit and the size data received corresponding to the first wire to be placed in the conduit;
providing, by the processing unit, the minimum conduit size calculated;

receiving a wire type corresponding to a second wire to be placed in the conduit wherein the second wire comprises a neutral wire;

receiving size data corresponding to the second wire to be placed in the conduit, wherein the size data corresponding to the first wire and the size data corresponding to the second wire are different; and receiving wire number data indicating a number of the second wire to be placed in the conduit, wherein calculating the minimum conduit size for the conduit is further based, at least in part, upon the wire number data received indicating the number of the second wire to be placed in the conduit and the size data received corresponding to the second wire to be placed in the conduit.

38. The method of claim 37, further comprising receiving a conduit type of the conduit, wherein calculating the minimum conduit size for the conduit is further based on the conduit type of the conduit.

39. The method of claim 37, further comprising receiving a conduit type of the conduit, wherein calculating the minimum conduit size for the conduit is further based on the conduit type of the conduit.

40. The method of claim 37,
wherein the wire type corresponding to the first wire and the wire type corresponding to the second wire are different.

* * * * *